(12) United States Patent
Tapia

(10) Patent No.: US 10,154,123 B2
(45) Date of Patent: Dec. 11, 2018

(54) INSERTION AND USE OF APPLICATION OR RADIO INFORMATION IN NETWORK DATA PACKET HEADERS

(71) Applicant: T-Mobile USA, Inc., Bellevue, WA (US)

(72) Inventor: Pablo Tapia, Snoqualmie, WA (US)

(73) Assignee: T-MOBILE USA, INC., Bellevue, WA (US)

(*) Notice: Subject to any disclaimer, the term of this patent is extended or adjusted under 35 U.S.C. 154(b) by 86 days.

(21) Appl. No.: 14/634,128

(22) Filed: Feb. 27, 2015

(65) Prior Publication Data

US 2015/0312385 A1    Oct. 29, 2015

Related U.S. Application Data

(60) Provisional application No. 61/985,317, filed on Apr. 28, 2014.

(51) Int. Cl.
| | |
|---|---|
| *H04L 29/06* | (2006.01) |
| *H04L 12/803* | (2013.01) |
| *H04W 28/10* | (2009.01) |
| *H04L 12/801* | (2013.01) |
| *H04L 12/841* | (2013.01) |

(52) U.S. Cl.
CPC .......... *H04L 69/22* (2013.01); *H04L 47/122* (2013.01); *H04L 69/161* (2013.01); *H04W 28/10* (2013.01); *H04L 47/14* (2013.01); *H04L 47/193* (2013.01); *H04L 47/28* (2013.01)

(58) Field of Classification Search
None
See application file for complete search history.

(56) References Cited

U.S. PATENT DOCUMENTS

| | | | |
|---|---|---|---|
| 7,657,628 B1* | 2/2010 | McDysan | G06F 11/2028 370/401 |
| 2003/0033434 A1 | 2/2003 | Kavacheri et al. | |

(Continued)

FOREIGN PATENT DOCUMENTS

| | | |
|---|---|---|
| WO | WO2008021182 | 2/2008 |
| WO | WO2011136589 | 11/2011 |

(Continued)

OTHER PUBLICATIONS

The PCT Search Report and Written Opinion dated Jul. 27, 2015 for PCT application No. PCT/US2015/025977, 12 pages.

(Continued)

Primary Examiner — Rebecca E Song
(74) Attorney, Agent, or Firm — Lee & Hayes, PLLC

(57) ABSTRACT

Techniques are described herein for receiving, by node of a telecommunication service provider, a network data packet from one of an application client of a telecommunication device and an application server. The node may then retrieve application information from a header of the network data packet and apply the application information to adapt radio delivery. Alternatively or additionally, the node may then insert radio information into the header of the network data packet in place of the application information. After performing the inserting or the retrieving, the node may transmit the network data packet to the other of the application client and the application server.

20 Claims, 6 Drawing Sheets

(56) References Cited

U.S. PATENT DOCUMENTS

| | | | | |
|---|---|---|---|---|
| 2013/0155856 A1* | 6/2013 | Zhang | ............... | H04L 47/193 370/235 |
| 2014/0022904 A1* | 1/2014 | Ahmad | ............ | H04W 28/0289 370/235 |
| 2014/0293796 A1* | 10/2014 | Jeong | ................ | H04M 15/66 370/236 |
| 2014/0314098 A1* | 10/2014 | Park | ................ | H04L 47/6215 370/417 |
| 2015/0117230 A1* | 4/2015 | Cui | .................... | H04W 24/10 370/252 |
| 2015/0156666 A1* | 6/2015 | Won | ............... | H04W 28/0231 370/229 |

FOREIGN PATENT DOCUMENTS

| | | |
|---|---|---|
| WO | WO2013133665 | 9/2013 |
| WO | WO2013143579 | 10/2013 |
| WO | WO2014042482 | 3/2014 |
| WO | WO2014051392 | 4/2014 |
| WO | WO2014058189 | 4/2014 |

OTHER PUBLICATIONS

The Extended European Search Report dated Nov. 16, 2017 for European Patent Application No. 15786435.6, 12 pages.

European Office Action dated Jul. 31, 2018, for European Application No. 15786435.6, a counterpart foreign application of U.S. Appl. No. 14/634,128, 9 pages.

\* cited by examiner

INSERTION AND USE OF APPLICATION OR RADIO INFORMATION IN NETWORK DATA PACKET HEADERS

RELATED APPLICATIONS

This patent application is a Non-provisional of and claims priority to U.S. Provisional Patent Application No. 61/985,317, filed Apr. 28, 2014. Application No. 61/985,317 is hereby incorporated by reference, in its entirety.

BACKGROUND

With the increasing use of telecommunication networks for data services, such as web browsing, video and audio streaming, and audio calls, along with the transition of other types of data (voice calls, etc.) from circuit-switched connections to packet-switched connections, telecommunication service providers have been faced with mounting network congestion issues. Both radio access networks (RAN) and backhaul of the telecommunication networks are burdened by the increased data traffic.

To optimize delivery and reduce congestion, telecommunication service providers are increasingly inspecting data packets transmitted across their networks to determine application type and other relevant metrics that may help in prioritizing the packets and improving user experience. Because of packet encryption, however, this inspection is often time and resource intensive.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques for receiving, by node of a telecommunication service provider, a network data packet from one of an application client of a telecommunication device and an application server. The node may then retrieve application information from a header of the network data packet and apply the application information to adapt radio delivery. Alternatively or additionally, the node may then insert radio information into the header of the network data packet in place of the application information. After performing the inserting or the retrieving, the node may transmit the network data packet to the other of the application client and the application server. The other of the application client and the application server may then retrieve the radio information from the header and apply the radio information to adapt application behavior.

In various implementations, the adapting of radio delivery by the node of the telecommunication network and of application behavior by the other of the application client and application server may reduce network congestion in a coordinated fashion. Further, the use of the header in a single network data packet or flow of network data packets between application endpoints and through a telecommunication network to carry multiple types of information reduces the need for transmission of additional control or signaling packets and reduces the packet inspection burden on the telecommunication service provider. Further benefits include reduced link inefficiencies and improved battery life.

Overview

Figure 1:
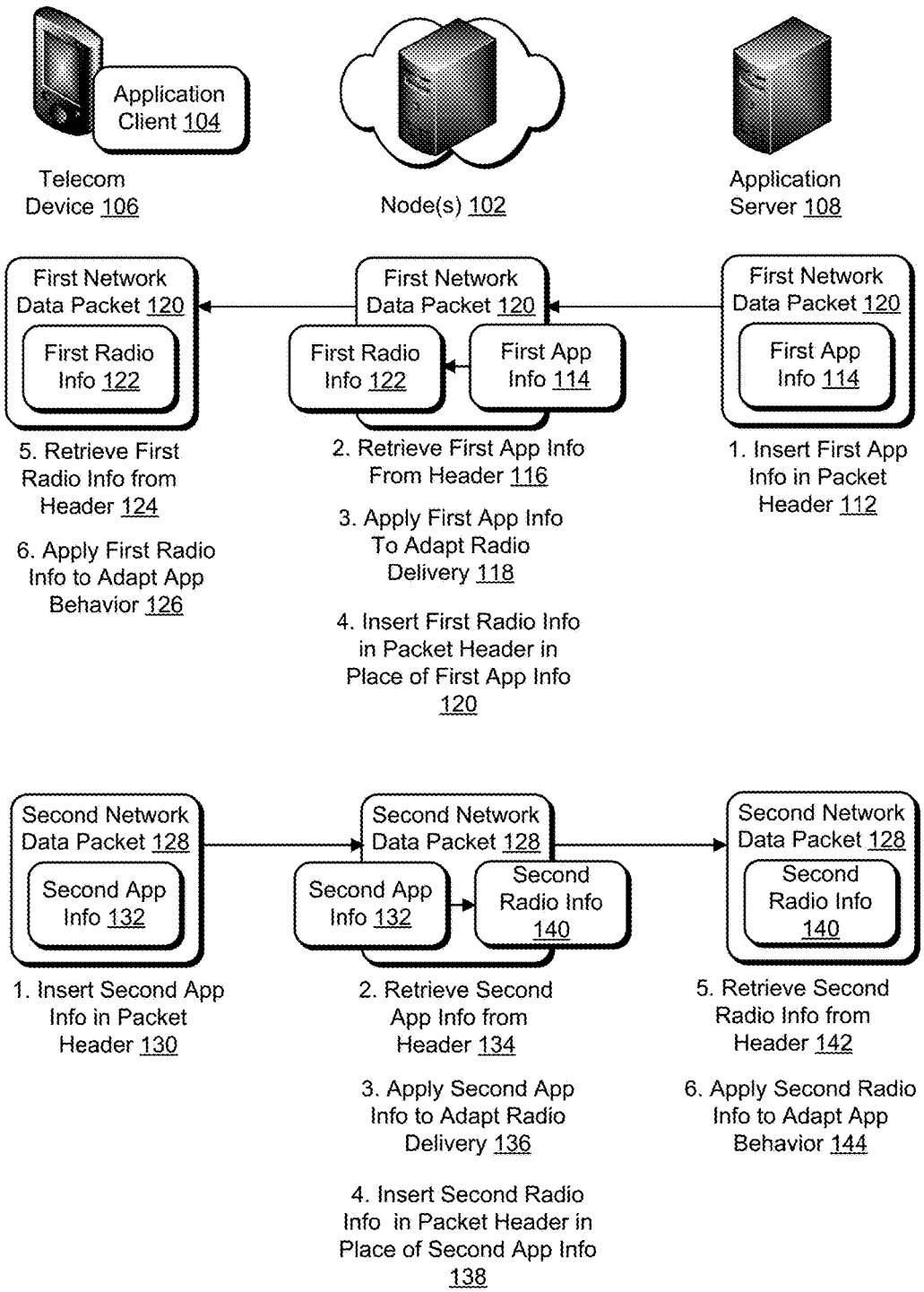
FIG. 1 illustrates an overview of devices involved in communication of network data packets in which headers of the network data packets are used to transmit application information or radio information between the devices to adapt application behavior, network behavior, or both in order to reduce congestion.

FIG. 1 illustrates an overview of devices involved in communication of network data packets in which headers of the network data packets are used to transmit application information or radio information between the devices to adapt application behavior, network behavior, or both in order to reduce congestion. As illustrated, one or more nodes 102 of a telecommunication service provider are involved in data connection between an application client 104 of a telecommunication device 106 and an application server 108.

The application server 108 may transmit a first network data packet 110 to the application client 104 through the one or more nodes 102. The application server 108 may insert 112 first application information 114 in the header of the first network data packet 110 and transmit the first network data packet 110 to the one or more nodes 102. A node 102 of the one or more nodes 102 may retrieve 116 and apply 118 the first application information 114. The node 102 may then insert 120 first radio information 122 in place of the first application information 114 in the header of the first network data packet 110 and transmit the first network data packet 110 to the application client 104. The application client 104 may then retrieve 124 and apply 126 the first radio information 122.

The application client 104 may then transmit a second network data packet 128 to the application server 108 through the one or more nodes 102. The application client 104 may insert 130 second application information 132 in the header of the second network data packet 128 and transmit the second network data packet 128 to the one or more nodes 102. A node 102 of the one or more nodes 102 may retrieve 134 and apply 136 the second application information 132. The node 102 may then insert 138 second radio information 140 in place of the second application information 132 in the header of the second network data packet 128 and transmit the second network data packet 128 to the application server 108. The application server 108 may then retrieve 142 and apply 144 the second radio information 140.

Figure 2:
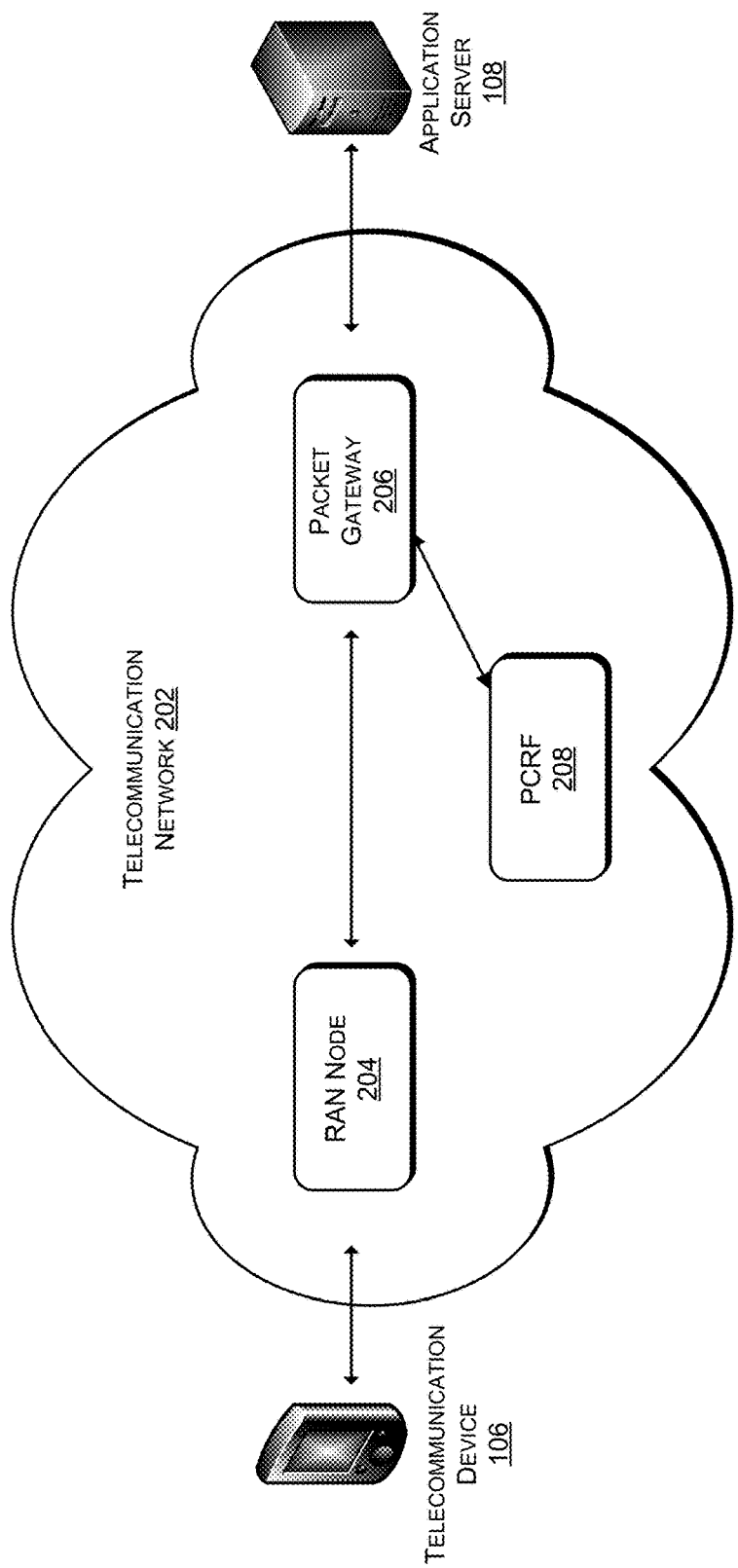
FIG. 2 illustrates an example environment which includes multiple nodes of a telecommunication service provider, such as RAN nodes, a gateway node, and a Policy Control Rules Function (PCRF), as well as an application server and a telecommunication device configured with an application client.
Figure 6:
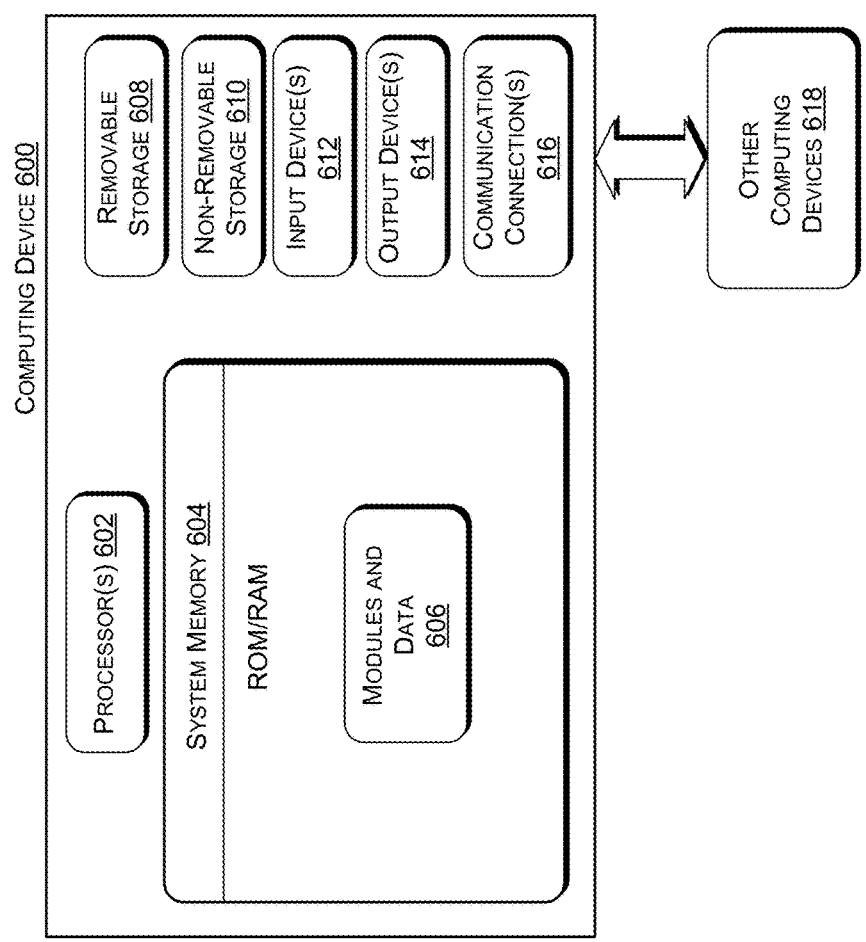
FIG. 6 illustrates an example system architecture of a computing device, such as a node of a telecommunication service provider, an application server, or a telecommunication device.

In various implementations, the one or more nodes 102 may each include any one or more computing devices, such as application-specific devices, gateways, routers, access points, etc. of a telecommunication service provider which may form at least a part of a telecommunication network of that telecommunication service provider. For example, the one or more nodes 102 may include nodes of a RAN, such as a base station, a Node B, an eNode B, a radio network controller (RNC), or a wireless access point. The one or more nodes 102 may also or instead include core network devices, such as a packet gateway and a PCRF. Other core network devices of the telecommunication service provider may include any of a mobility management entity (MME), a serving gateway, an evolved packet data gateway (ePDF), a gateway general packet radio service (GPRS) support node (GGSN), a serving GPRS support node (SGSN), a home location register (HLR), or a home subscriber server (HSS). These node(s) 102 may be implemented as any one or more computing devices, such as PCs, laptop computers, workstations, server systems, mainframes, server farms, or any other computing devices. Examples of such RAN and core network devices and the environment they form part of are illustrated in FIG. 2 and are described below in detail with reference to that figure. An example computing device capable of implementing any of the one or more nodes 102 is also illustrated in FIG. 6 and is described below in detail with reference to that figure.

In some implementations, the application client 104 may be any sort of application client. For example, the application client may be a voice calling client, a messaging client, a video calling or video chat client, a web browser, a media player, or any other sort of application which communicates with an application server 108 and provide a user of the telecommunication device 106 with some service, content, or experience. Because of the communication with the application server 108 over the telecommunication network, the quality of experience for usage of the application client 104 may vary with network congestion and other network or application-specific factors.

The telecommunication device 106 may be any sort of telecommunications device, such as a smart phone, a cellular phone, a personal digital assistant (PDA), a personal computer (PC), a laptop, a desktop, a workstation, a media player, a gaming device, a television, a media center, or the like. An example computing device capable of implementing the telecommunication device 106 is illustrated in FIG. 6 and is described below in detail with reference to that figure.

In some implementations, the application server 108 may server for voice calling, text messaging, video calling, video chat, or other communication. Other examples of application servers 108 include web servers, media servers, or other content servers. The application server 108 may be any server that provides application services through an application client 104. Also, the application server 108 may be any sort of computing device, such as a personal computer (PC), a laptop computer, a workstation, a server system, a mainframe, a server farm, or any other computing device. An example computing device capable of implementing the application server 108 is also illustrated in FIG. 6 and is described below in detail with reference to that figure.

In various implementations, the application server 108 may transmit a first network data packet 110 to the application client 104. The first network data packet 110 may be an sort of data packet, such as a transmission control protocol/Internet protocol (TCP/IP) packet (also referred to as a TCP packet) with a header and a payload. The header may include any number of fields of varying bit sizes, such as source and destination address fields. In preparing the first network data packet 110, the application server 108 may insert 112 first application information 114 in the header of the first network data packet 110. Such first application information 114 could be inserted in one or both of explicit congestion notification bits of the header or reserved bits of the header. The first application information 114 could indicate at least one of an application type, application characteristics, a desired bitrate for quality of user experience (QoE), an indication of data expectations of the application, or a device identifier for the application server 108. In some examples, the first network data packet 110 may be multiple network data packets with the first application information 114 distributed among the headers of the multiple network data packets.

The first network data packet 110 may be transmitted through the one or more nodes 102 of the telecommunication network of the telecommunication service provider enroute to the application client 104. In some implementations, a packet gateway or GGSN (referred to hereinafter as the "packet gateway") of the one or more nodes 102 may receive first network data packet 110, retrieve the first application information 114 from the header, and provide the retrieved first application information 114 to a PCRF of the one or more nodes 102. Examples of the packet gateway and PCRF are illustrated in FIG. 2 and described below in detail with reference to that figure.

One or more core network devices of the one or more nodes 102 may then provide the first network data packet 110 to a RAN device of the RAN connected to the telecommunication device 106, such as a base station, Node B, eNode B, or access point, or an RNC. That RAN device (hereinafter RAN node 102) may receive the first network data packet 110 and retrieve 116 the first application information 114 from the header of the first network data packet 110. The RAN node 102 may then apply 118 the first application information 114 to adapt radio delivery. In some implementations, the RAN node 102 may adapt radio delivery in the downlink based at least in part on the first application information 114. For instance, delay sensitive data can be sent with higher priority, or video streaming content can be tried to be served with an average throughput as indicated by the application server 108, etc.

The RAN node 102 may then insert 120 first radio information 122 in the header of the first network data packet 110 in place of the first application information 114. The RAN node 102 may have compiled the first radio information 122 by gathering radio conditions specific to telecommunication device, scheduler load, and sector congestion information. The first radio information 122 may include a desired bitrate in the uplink, which may be calculated by the network based on congestion situation and user specific radio conditions. The first radio information may also or instead include an available bandwidth which may indicate the L1 throughput that the user could potentially achieve if the application client 104 would send data at that time. Such available bandwidth may consider limitations in minimum bandwidth regenerating (MBR), current radio conditions, scheduler utilization, or quality of service (QoS) priority. Further, the first radio information 122 may also or instead include a congestion indication, a type of congestion (e.g., control plane/user plane), a level of congestion (e.g., low, medium, high, or overload), a mobility state (e.g., stationary, slow speed, or high speed, etc.), or a radio state (e.g., full transmission, low power mode, etc.). In some implementations, when the first network data packet 110 comprises multiple network data packets, the RAN node 102 may distribute the first radio information 122 among the headers of the multiple network data packets.

In other embodiments, the inserting 120 may be performed by a core network device of the one or more nodes 102, such as the packet gateway. In such embodiments, the packet gateway may receive the first radio information 122 or radio conditions from the RAN node 102 and may insert 120 the first radio information 122 in the header of the first network data packet 110. The packet gateway then transmits the first network data packet 110 to the RAN node 102 for transmission to the application client 104.

In some implementation, after insertion 120 by the RAN node 102 or by the packet gateway, the RAN node 102 transmits the first network data packet 110 to the application client 114 over an air interface (e.g., radio frequency transmission).

The application client 104, upon receiving the first network data packet 110, may then retrieve 124 the first radio information 122 from the header of the first network data packet 110. The application client 104 may then apply 126 the first radio information 122 to adapt application behavior, such as data transmission behavior.

In various implementations, the application client 104 may transmit a second network data packet 128 to the application server 108. The second network data packet 128 may be any sort of data packet, such as a TCP/IP packet with a header and a payload. The second network data packet 128 could, for example, be sent in response to the first network data packet 110. The header may include any number of fields of varying bit sizes, such as source and destination address fields. In preparing the second network data packet 128, the application client 104 may insert 130 second application information 132 in the header of the second network data packet 128. The second application information 132 could be the same as the first application information 114, overlapping with the first application information 114, or different from the first application information 114. Such second application information 132 could be inserted in one or both of explicit congestion notification bits of the header or reserved bits of the header. The second application information 132 could indicate at least one of an application type, application characteristics, a desired bitrate for QoE, an indication of data expectations of the application, or a device identifier for the telecommunication device 106. In some examples, the second network data packet 128 may be multiple network data packets with the second application information 132 distributed among the headers of the multiple network data packets.

The second network data packet 128 may be transmitted through the one or more nodes 102 of the telecommunication network of the telecommunication service provider enroute to the application server 108. In some implementations, the RAN node 102 may receive the second network data packet 128 from the telecommunication device 106. That RAN node 102 may retrieve 134 the second application information 132 from the header of the second network data packet 128. The RAN node 102 may then apply 136 the second application information 132 to adapt radio delivery.

In some implementations, the RAN node 102 may adapt radio delivery in the uplink based at least in part on the second application information 132. For instance, delay sensitive data can be sent with higher priority or background data delivery can be delayed during periods of uplink congestion, etc.

The RAN node 102 may then insert 138 second radio information 140 in the header of the second network data packet 128 in place of the second application information 132. The second radio information 140 may be different from, overlapping with, or the same as the first radio information 122. The RAN node 102 may have compiled the second radio information 140 by gathering radio conditions specific to telecommunication device, general network congestion information, backhaul congestion information, scheduler load, and sector congestion information. The second radio information 140 may include a desired bitrate in the downlink, which may be calculated by the network based on congestion situation and user specific radio conditions. The second radio information 140 may also or instead include an available bandwidth which may indicate the L1 throughput that the user could potentially achieve if the application would send data at that time. Such available bandwidth may consider limitations in MBR, current radio conditions, scheduler utilization, or QoS priority. Further, the second radio information 140 may also or instead include a congestion indication, a type of congestion (e.g., control plane/user plane), a level of congestion (e.g., low, medium, high, or overload), a mobility state (e.g., stationary, slow speed, or high speed, etc.), or a radio state (e.g., full transmission, low power mode, etc.). In some implementations, when the second network data packet 128 comprises multiple network data packets, the RAN node 102 may distribute the second radio information 140 among the headers of the multiple network data packets.

The RAN node 102 may then transmit the second network data packet 128 through the packet gateway enroute to the application server 108. In some implementations, the packet gateway may receive the second network data packet 128, retrieve the second radio information 140 from the header, and provide the retrieved second radio information 140 to the PCRF.

In other embodiments, the inserting 138 may be performed by a core network device of the one or more nodes 102, such as the packet gateway. In such embodiments, the packet gateway may receive the second radio information 140 or radio conditions from the RAN node 102 and may insert 138 the second radio information 140 in the header of the second network data packet 128 in place of the second application information 132.

In some implementation, after insertion 138 by the RAN node 102 or by the packet gateway, the packet gateway transmits the second network data packet 128 to the application server 108.

The application server 108, upon receiving the second network data packet 128, may then retrieve 142 the second radio information 140 from the header of the second network data packet 128. The application server 108 may then apply 144 the second radio information 140 to adapt application behavior, such as data transmission behavior.

In various implementations, the radio information provided by the one or more nodes 102 and the adaptations made by the node(s) 102, application client 104, and application server 108 may be determined/selected by a policy of the telecommunication service provider for coordinated reduction of network congestion.

Applications can make use of the radio information to adapt behavior in a number of ways. For example, TCP can significantly improve the performance of its slow start mechanism by starting at a higher speed based on a maximum transmission speed received in the radio information. In another example, a video server may be transmitting video to a client over a radio network that has bursts of high speed followed by periods of stalling. Such irregular radio service may confuse the video application into first thinking that there is a high speed link and then into thinking that a link error has occurred. By indicating the irregular radio service to the video server through the radio information, the video server is able to adjust transmission to transmit at a reduced rate and alleviate the network congestion. In a further example, a voice server and voice calling client may receive radio information indicating congestion, and the voice server and voice calling client may, in response, renegotiate the voice codecs used.

Example Environment

FIG. 2 illustrates an example environment which includes multiple nodes of a telecommunication service provider, such as RAN nodes, a gateway node, and a PCRF, as well as an application server and a telecommunication device configured with an application client. As illustrated, a telecommunication network 202 includes a RAN node 204, a packet gateway 206, and a PCRF 208. An application client 104 of a telecommunication device 106 and an application server 108 exchange network data packets through the telecommunication network 202.

In various implementations, the telecommunication network 202 may be comprised of any of the nodes 102 described above. The telecommunication network 202 may include at least a RAN with at least a single RAN node 204 and a core network with at least a packet gateway 206 and PCRF 208. The telecommunication network 202 may include, however, any number of RANs associated with various locations, each RAN providing wireless access to telecommunication devices, such as telecommunication device 106, within a distance range. Each RAN may support one or more wireless access technologies, such as Long Term Evolution (LTE), High Speed Packet Access (HSPA), Evolved High Speed Packet Access (HSPA+), Global System for Mobile Communications (GSM), or other 5G, 4G, or 3G wireless access technologies. A RAN may also or instead utilize unlicensed spectrum and may offer WiFi or WiMax connections.

RAN nodes 204 are described above in detail with reference to the example RAN node 102. Such RAN nodes 204 may perform any or all of the retrieving 116, applying 118, inserting 120, retrieving 134, applying 136, or inserting 138. Also or instead, a RAN node 204 may provide radio information or congestion information to a packet gateway, such as the packet gateway 206, to enable the packet gateway to perform the inserting 120 or the inserting 138 and may receive application information from the packet gateway and perform the applying 118 or applying 136 based on the received application information. Examples of RAN nodes 204 include base stations, Node Bs, eNode Bs, or RNCs.

The packet gateway 206 is described above in detail with reference to the packet gateway of the node(s) 102. Such a packet gateway 206 may be packet gateway or a GGSN of a core network of the telecommunication network 202. The packet gateway 206 may receive radio information from the RAN node 204, perform the inserting 120 or the inserting 138, retrieve application information, and provide the application information to the RAN node 204. Also or instead, the packet gateway 206 may receive a network data packet from the application server 108 or from the RAN node 204 and may decode the header of the network data packet. If received from the application server 108, the packet gateway 206 may check if the application information in the decoded header indicates that the application associated with the application server 108 is not supported by the telecommunication service provider. When the application associated with the application server 108 is not supported by the telecommunication service provider, the packet gateway 206 may delete the TCP markings from the network data packet. The packet gateway 206 may also or instead provide the application information or radio information from the decoded header to the PCRF 208.

In various implementations, the PCRF 208 may be any sort of PCRF of a telecommunication network. The PCRF 208 may receive application information or radio information from the packet gateway 206. Upon receiving application information, the PCRF 208 may apply an application management rule to a flow of network data packets that includes the network data packet. Upon receiving radio information, the PCRF 208 may apply a congestion management rule to a flow of network data packets that includes the network data packet.

Example Operations

Figure 3:
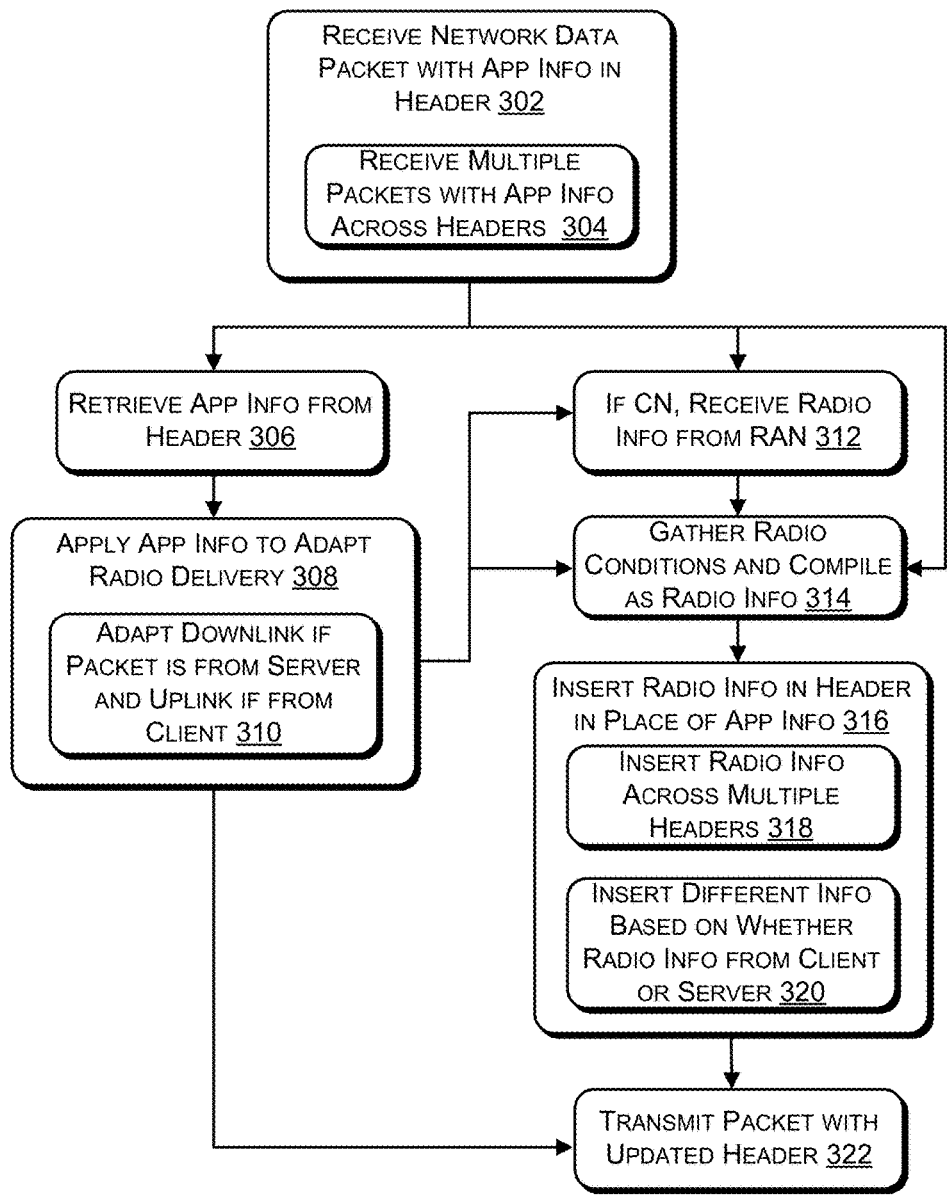
FIG. 3 illustrates an example process for receiving a packet, performing at least one of retrieving and applying application information from the packet header or inserting radio information in place of the application information in the packet header, and transmitting the packet.
Figure 4:
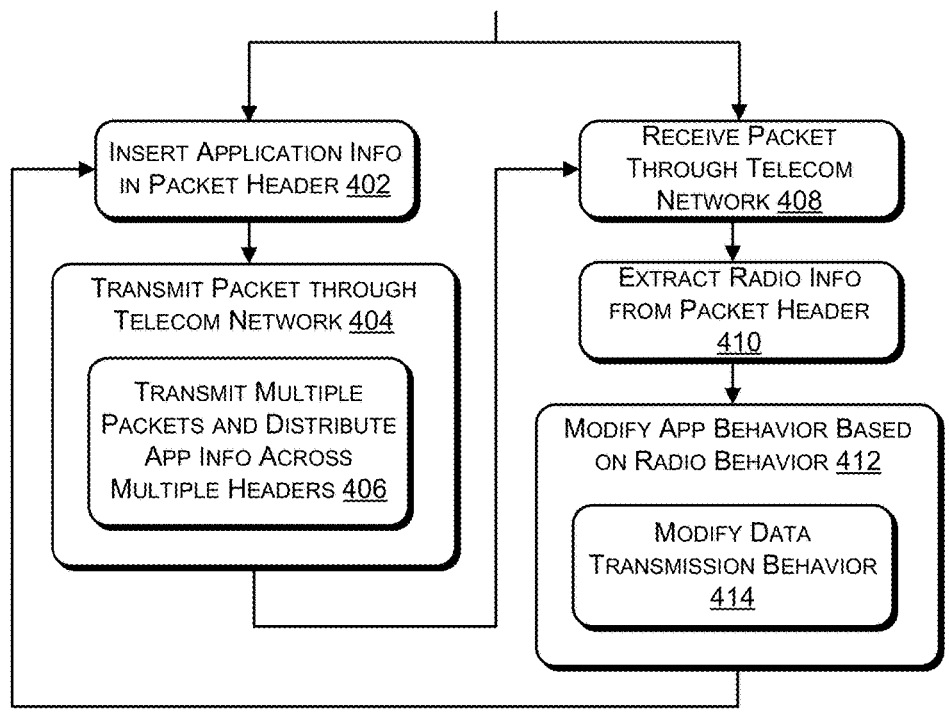
FIG. 4 illustrates an example process for an application client or application server to receive a packet, retrieve radio information from the header of the packet, apply the radio information, and to send another packet which includes application information in the packet's header.
Figure 5:
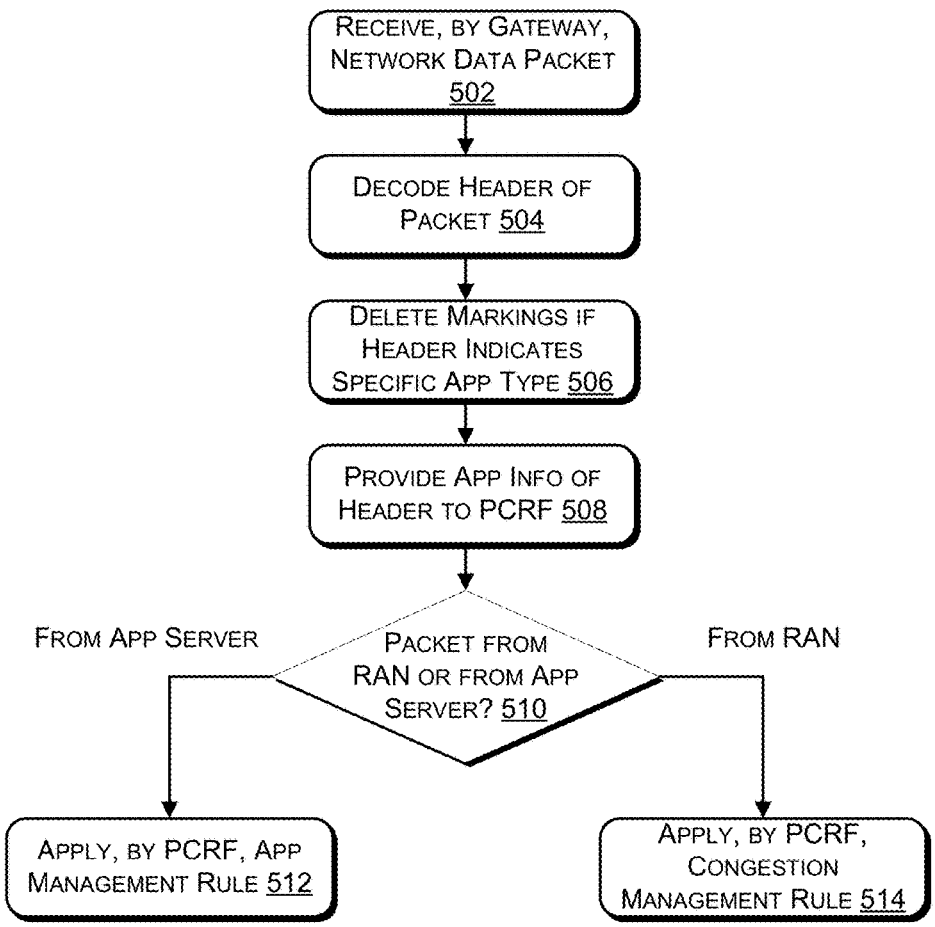
FIG. 5 illustrates an example process for core network devices of a telecommunication service provider to retrieve application information or radio information from headers of network data packets and to apply rules based on the application information or radio information.

FIGS. 3-5 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 3 illustrates an example process for receiving a packet, performing at least one of retrieving and applying application information from the packet header or inserting radio information in place of the application information in the packet header, and transmitting the packet. As shown at 302, a node of a telecommunication service provider may receive a network data packet from one of an application client of a telecommunication device and an application server. The header of the network data packet may include application information provided by the application client or application server. The node may be a base station, a radio network controller, a Node B, an eNode B, an access point, a packet gateway, a RAN node, or a core network node. At 304, the receiving may include receiving multiple network data packets with the application information distributed in respective headers of the multiple network data packets.

At 306, the node may retrieve the application information from the header of the network data packet. In various implementations, the header may be a TCP header and the application information may be represented in one or both of explicit congestion notification bits of the TCP header or reserved bits of the TCP header. The application information may include at least one of an application type, application characteristics, a desired bitrate, an indication of data expectations, or a device identifier.

At 308, the node may apply the application information to adapt radio delivery. At 310, adapting the radio delivery may include adapting downlink radio delivery based on the application information when the network data packet is from the application server and adapting uplink radio delivery based on the application information when the network data packet is from the application client.

At 312, when the node is a core network node, the node may receive the radio information from a RAN node or provide the application information to a RAN node.

At 314, the node may gather radio conditions specific to telecommunication device, scheduler load, and sector congestion information and compiling the radio conditions, the scheduler load, and the sector congestion information as the radio information.

At 316, the node may insert the radio information in place of the application information in the header of the network data packet. The radio information may include at least one of a desired bitrate, an available bandwidth, a congestion indication, a type of congestion, a level of congestion, a mobility state, or a radio state. At 318, the inserting may include inserting the radio information in the respective headers of the multiple network data packets in place of the application information. At 320, the inserting may include inserting different radio information depending on whether the network data packet is received from the application client or the application server.

In some implementations, the node may utilize a policy that specifies which actions taken to adapt radio delivery and what radio information is provided to cause adaptation by the application client or the application server to provide coordinated congestion mitigation.

At 322, after performing either or both of the applying at 308 or the inserting at 316, the node may transmit the network data packet. If the network data packet was received at 302 from the application client, the node may transmit, at 322, the network data packet to the application server. If the network data packet was received at 302 from the application server, the node may transmit, at 322, the network data packet to the application client.

FIG. 4 illustrates an example process for an application client or application server to receive a packet, retrieve radio information from the header of the packet, apply the radio information, and to send another packet which includes application information in the packet's header. As shown at 402, one of an application client or application server may insert application information in a header of a first network data packet. At 404, the one of the application client or application server may transmit the first network data packet through a RAN to the other of the application client or application server. At 406, the transmitting may comprise transmitting multiple first network data packets and distributing the application information among the headers of the multiple first network data packets.

At 408, either before, in parallel with, or after the operations shown at 402-406, the one of the application client or application server may receive, through the RAN, a second network data packet. A header of the second network data packet may include radio information. At 410, the one of the application client or application server may extract the radio information from the header. At 410, the one of the application client or application server may modify application behavior based on the radio information. At 412, the modifying application behavior comprises modifying data transmission behavior.

FIG. 5 illustrates an example process for core network devices of a telecommunication service provider to retrieve application information or radio information from headers of network data packets and to apply rules based on the application information or radio information. As shown at 502, a packet gateway of the core network devices may receive a network data packet. The packet gateway may receive the network data packet from a RAN or from an application server.

At 504, the packet gateway may decode a header of the network data packet.

At 506, the packet gateway may determine, based on application information included in the header, whether the network data packet is associated with an application type not approved by the telecommunication service provider and may delete the TCP markings from the network data packet based on that determination.

At 508, the packet gateway may provide the network data packet to a PCRF of the core network devices.

At 510, the PCRF may determine whether the network data packet was received from the RAN or from an application server.

At 512, if received from an application server, the PCRF may apply an application management rule to a flow of packets that includes the network data packet.

At 514, if received from a RAN, the PCRF may apply a congestion management rule to the flow of packets that includes the network data packet.

Example System

FIG. 6 illustrates an example system architecture of a computing device, such as a node of a telecommunication service provider, an application server, or a telecommunication device. As illustrated, the computing device 600 includes processor(s) 602 and a system memory 604 storing modules and data 606. The computing device 600 also includes a removable storage 608, a non-removable storage 610, input device(s) 612, output device(s) 614, and communication connections 616 for communicating with other computing devices 618.

In some embodiments, the processor(s) 602 is a central processing unit (CPU), a graphics processing unit (GPU), or both CPU and GPU, or other processing unit or component known in the art.

In various embodiments, system memory 604 is volatile (such as RAM), non-volatile (such as ROM, flash memory, etc.) or some combination of the two. Example system memory 604 may include one or more of RAM, ROM, EEPROM, a Flash Memory, a miniature hard drive, a memory card, an optical storage, a magnetic cassette, a magnetic tape, a magnetic disk storage or another magnetic storage device, or any other medium.

As previously mentioned, the system memory 604 stores modules and data 606. The modules and data 606 may comprise any one or more modules, applications, processes, threads, classes, algorithms, data structures, files, and/or databases, such as the modules, applications, processes, threads, classes, algorithms, data structures, files, and/or databases utilized in performing the operations described above, some part of which are illustrated in FIGS. 1-5.

For example, the modules and data 606 may include one or more modules for retrieving radio information from a network data packet header, applying the radio information to adapt application behavior, inserting application information in a network data packet header, and transmitting the network data packet with the application information. The modules and data 606 may also or instead include one or more modules for receiving a network data packet, retrieving application information from a header of the network data packet, adapting radio delivery based on the application information, inserting radio information in the header in place of the application information, and transmitting the network data packet with the radio information. Further, the modules and data 606 may also or instead include one or more modules for retrieving radio or application information from a header of a network data packet, deleting the packet if the information indicates that an associated application is not supported, providing the information to a PCRF, and applying, at the PCRF, a rule for application management or congestion management to a flow of network data packets that includes the network data packet.

The computing device 600 includes data storage devices (removable and/or non-removable) in addition to the system memory 604, such as, for example, magnetic disks, optical disks, or tape. Such additional storage is illustrated in FIG. 6 by removable storage 608 and non-removable storage 610. Non-transitory computer-readable media may include volatile and nonvolatile, removable and non-removable tangible, physical media implemented in technology for storage of information, such as computer readable instructions, data structures, program modules, or other data. System memory 604, removable storage 608, and non-removable storage 610 are all examples of non-transitory computer-readable media. Non-transitory computer-readable media may include volatile and nonvolatile, removable and non-removable tangible, physical media implemented in technology for storage of information, such as computer readable instructions, data structures, program modules, or other data. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the computing device 600. Any such non-transitory computer-readable media may be part of the computing device 600.

In various embodiment, any or all of system memory 604, removable storage 608, and non-removable storage 610 store programming instructions which, when executed, implement some or all of the above-described operations of the computing device 600.

The computing device 600 may also have input device(s) 612, such as a keyboard, a mouse, a touch-sensitive display, voice input device, etc., and output device(s) 614 such as a display, speakers, a printer, etc. These devices are well known in the art and need not be discussed at length here.

The computing device 600 also contains communication connections 616 that allow the computing device 600 to communicate with other computing devices 618, such as a node 102, the telecommunication device 106, the application server 108, the RAN node 204, the packet gateway 206, or the PCRF 208. In some implementations, such as when the computing device 600 is a node of a RAN, the communication connections 616 may be provided through radio antennas or other transceiver of the computing device 600.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

I claim:
1. A method comprising:
receiving, by a node of a telecommunication service provider, a network data packet from one of an application client of a telecommunication device or an application server;
retrieving, by the node, application information from a header of the network data packet and applying the application information to adapt radio delivery;
inserting radio information into the header of the network data packet in place of the application information, and
after performing the inserting, transmitting, by the node, the network data packet to the other of the application client or the application server,
wherein the inserting comprises inserting different radio information depending on whether the network data packet is received from the application client or the application server, and
wherein the application information includes at least one of an application type, application characteristics, a desired bitrate, an indication of data expectations, or a device identifier.

2. The method of claim 1, wherein the header is a transmission control protocol (TCP) header and the radio information or application information are represented in one or both of explicit congestion notification bits of the TCP header or reserved bits of the TCP header.

3. The method of claim 1, wherein the node is base station, a radio network controller, a node b, an eNode b, an access point, a packet gateway, a radio access network (RAN) node, or a core network node.

4. The method of claim 3, wherein, when the node is a packet gateway or a core network node, the method further includes receiving the radio information from a RAN node or providing the application information to a RAN node.

5. The method of claim 1, wherein the receiving comprises receiving multiple network data packets with the application information distributed in respective headers of the multiple network data packets.

6. The method of claim 5, wherein the inserting comprises inserting the radio information in the respective headers of the multiple network data packets in place of the application information.

7. The method of claim 1, wherein the radio information includes at least one of a desired bitrate, an available bandwidth, a congestion indication, a type of congestion, a level of congestion, a mobility state, or a radio state.

8. The method of claim 1, further comprising gathering radio conditions specific to telecommunication device, scheduler load, and sector congestion information and compiling the radio conditions, the scheduler load, and the sector congestion information as the radio information.

9. The method of claim 1, wherein adapting the radio delivery comprises adapting downlink radio delivery based on the application information when the network data packet is from the application server and adapting uplink radio delivery based on the application information when the network data packet is from the application client.

10. One or more non-transitory computer-readable media having stored thereon computer-executable instructions configured to program a node of a radio access network to perform operations comprising:
receiving a network data packet from one of an application client of a telecommunication device or an application server;
retrieving application information from a header of the network data packet;
applying the application information to adapt radio delivery;

inserting radio information in place of the application information in the header of the network data packet, wherein the inserting comprises inserting different radio information depending on whether the network data packet is received from the application client or the application server; and transmitting the network data packet with the inserted radio information to the other of the application client or the application server, wherein the application information includes at least one of an application type, application characteristics, a desired bitrate, an indication of data expectations, or a device identifier.

11. The one or more non-transitory computer-readable media of claim 10, wherein the node utilizes a policy that specifies which actions taken to adapt radio delivery and what radio information is provided to cause adaptation by the application client or the application server to provide coordinated congestion mitigation.

12. The one or more non-transitory computer-readable media of claim 10, wherein the radio information includes at least one of a desired bitrate, an available bandwidth, a congestion indication, a type of congestion, a level of congestion, a mobility state, or a radio state.

13. A method implemented in a telecommunication device with an application client or in an application server, the method comprising:

receiving, by one of the application client or the application server and through a radio access network, a first network data packet, wherein a header of the first network data packet includes radio information, wherein the radio information differs depending on whether the first network data packet is received by the application client or the application server;

extracting, by the one of the application client or the application server, the radio information from the header;

modifying application behavior based on the radio information;

inserting, by the one of the application client or the application server, application information in a header of a second network data packet; and transmitting, by the one of the application client or the application server, a second network data packet through the radio access network to the other one of the application client or application server, wherein the application information includes at least one of an application type, application characteristics, a desired bitrate, an indication of data expectations, or a device identifier.

14. The method of claim 13, wherein transmitting the second network data packet includes transmitting multiple second network data packets, the multiple second network data packets having multiple headers, and distributing the application information among the headers of the multiple second network data packets.

15. The method of claim 13, wherein modifying application behavior comprises modifying data transmission behavior.

16. The method of claim 13, wherein the header is a transmission control protocol (TCP) header and the radio information or the application information is represented in one or both of explicit congestion notification bits of the TCP or reserved bits of the TCP header.

17. The method of claim 13, wherein the radio information includes at least one of a desired bitrate, an available bandwidth, a congestion indication, a type of congestion, a level of congestion, a mobility state, or a radio state.

18. The method of claim 13, wherein the application server is a web server, a media server, or a content server.

19. The method of claim 13, wherein the application server is a server that provides application services through the application client.

20. The method of claim 13, wherein the application server is a server for voice calling, text messaging, video calling, video chat, or other communication.

* * * * *